(12) United States Patent
Xie et al.

(10) Patent No.: US 11,382,095 B2
(45) Date of Patent: Jul. 5, 2022

(54) COMMUNICATION METHOD, ACCESS NETWORK DEVICE, AND SYSTEM

(71) Applicant: HUAWEI TECHNOLOGIES CO., LTD., Guangdong (CN)

(72) Inventors: Xinqian Xie, Beijing (CN); Zhiheng Guo, Beijing (CN); Wei Sun, Shenzhen (CN); Yongqiang Fei, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 126 days.

(21) Appl. No.: 16/502,566

(22) Filed: Jul. 3, 2019

(65) Prior Publication Data

US 2019/0327737 A1    Oct. 24, 2019

Related U.S. Application Data

(63) Continuation of application No. PCT/CN2018/071291, filed on Jan. 4, 2018.

(30) Foreign Application Priority Data

Jan. 5, 2017 (CN) .......................... 201710008208.1

(51) Int. Cl.
| | | |
|---|---|---|
| *H04W 72/04* | (2009.01) | |
| *H04W 24/08* | (2009.01) | |
| *H04W 72/12* | (2009.01) | |

(52) U.S. Cl.
CPC ....... *H04W 72/0446* (2013.01); *H04W 24/08* (2013.01); *H04W 72/0493* (2013.01); *H04W 72/1263* (2013.01)

(58) Field of Classification Search
CPC combination set(s) only.
See application file for complete search history.

(56) References Cited

U.S. PATENT DOCUMENTS

2011/0003598 A1    1/2011  Ma et al.
2012/0188955 A1*   7/2012  Zhang ..................... H04L 5/005
                                                    370/329

(Continued)

FOREIGN PATENT DOCUMENTS

CN       102064878 A       5/2011
CN       102893697 A       1/2013

(Continued)

*Primary Examiner* — Vinncelas Louis
(74) *Attorney, Agent, or Firm* — Womble Bond Dickinson (US) LLP

(57) ABSTRACT

A first access network device sends indication information to a second access network device within a first time segment of a first subframe. The first subframe includes a second time segment and the first time segment, the second time segment is used by the first access network device to communicate with a first terminal device, the indication information includes first information, and the first information indicates a communication type of the first access network device within a first target time segment of a second subframe. The first access network device further communicates with a second terminal device or the first terminal device based on a communication type indicated by the first information within the first target time segment. The second access network device can detect a signal interference status in time, and the second access network device can use an interference coordination technology in time.

18 Claims, 15 Drawing Sheets

(56) References Cited

U.S. PATENT DOCUMENTS

| | | |
|---|---|---|
| 2012/0281604 A1* | 11/2012 | Papasakellariou ............... H04L 27/2613 370/310 |
| 2013/0012217 A1* | 1/2013 | Suda ................. H04W 72/0446 455/450 |
| 2013/0033998 A1 | 2/2013 | Seo et al. |
| 2013/0039253 A1 | 2/2013 | Takano |
| 2014/0092921 A1* | 4/2014 | Seo ................... H04W 72/0406 370/474 |
| 2015/0208363 A1 | 7/2015 | Fu et al. |
| 2015/0365830 A1* | 12/2015 | Wei ....................... H04W 16/14 370/280 |
| 2016/0007232 A1 | 1/2016 | Wang et al. |
| 2016/0050577 A1 | 2/2016 | Rao et al. |
| 2016/0113007 A1* | 4/2016 | Centonza ............. H04B 7/2656 370/280 |
| 2017/0135101 A1 | 5/2017 | Li et al. |
| 2019/0089473 A1 | 3/2019 | Deng et al. |
| 2019/0165851 A1* | 5/2019 | Tiirola ................... H04B 7/155 |

FOREIGN PATENT DOCUMENTS

| | | |
|---|---|---|
| CN | 103563478 A | 2/2014 |
| CN | 103582000 A | 2/2014 |
| CN | 104349384 A | 2/2015 |
| CN | 104811285 A | 7/2015 |
| CN | 105009667 A | 10/2015 |
| CN | 105432033 A | 3/2016 |
| CN | 105813108 A | 7/2016 |
| CN | 105873074 A | 8/2016 |
| WO | 2015020589 A1 | 2/2015 |
| WO | 2016015317 A1 | 2/2016 |
| WO | 2016/032378 A1 | 3/2016 |

* cited by examiner

COMMUNICATION METHOD, ACCESS NETWORK DEVICE, AND SYSTEM

CROSS-REFERENCE TO RELATED APPLICATIONS

This application is a continuation of International Application No. PCT/CN2018/071291, filed on Jan. 4, 2018, which claims priority to Chinese Patent Application No. 201710008208.1, filed on Jan. 5, 2017. The disclosures of the aforementioned applications are hereby incorporated by reference in their entireties.

TECHNICAL FIELD

The present invention relates to the field of communications technologies, and in particular, to a communication method, an access network device, and a system.

BACKGROUND

A frequency division duplex (FDD) mode and a time division duplex (TDD) mode are commonly used in a Long Term Evolution (LTE) or Long Term Evolution Advanced (LTE-A) communications system. Downlink communication and uplink communication are included in the FDD mode and the TDD mode. In the downlink communication, an access network device (such as a base station) transmits information to a user terminal (such as a mobile phone or a tablet); and in the uplink communication, the user terminal transmits information to the access network device.

Generally, in the TDD mode, for an area covered by a same band, downlink communication or uplink communication needs to be performed in all cells within the area for a period of time. In actual application, because downlink and uplink service volumes of different cells are significantly different at a same time, using a same uplink-downlink communication configuration for all the cells cannot efficiently meet a service requirement of each cell. To improve utilization of network transmission resources, in the TDD mode, transmission in each cell may be separately configured by using a flexible duplex technology. For example, the uplink-downlink communication configuration for long-term transmission may be determined based on a ratio of uplink services to downlink services in the current cell, or transmission in each transmission time interval (TTI) is dynamically scheduled.

As shown in FIG. 1, the following cases may occur in the TDD mode in which the flexible duplex technology is used.

In a same TTI, when a first cell is used for uplink communication and one or more neighboring second cells are used for downlink communication, because transmit power of the access network device is much higher than transmit power of the user terminal, a first access network device may also receive a downlink signal sent by a second access network device when receiving an uplink signal sent by a user terminal 1. Because a band used by the second access network device to send the downlink signal is the same as a band used by the user terminal 1 to send the uplink signal, the first access network device cannot distinguish between the signal sent by the user terminal 1 and the signal sent by the second access network device. The signal sent by the second access network device causes severe interference to the uplink signal sent by the user terminal 1.

For a wireless communications system that works in the FDD mode, two symmetric bands are used for information transmission: one band is used for downlink communication, and the other band is used for uplink communication. Because downlink service volumes and uplink service volumes of cells covered by a same pair of bands are significantly different at a same time, to improve the utilization of the network transmission resources, the flexible duplex technology may also be used; to be specific, downlink data is transmitted on an uplink band, and transmission of each cell may be separately configured. For example, transmission time for transmitting the downlink data by using the uplink spectrum may be determined based on a ratio of uplink services to downlink services in the current cell.

Similarly, as shown in FIG. 1, the following cases may occur in the FDD mode in which the flexible duplex technology is used.

In a same TTI, when an uplink band of the second cell is used for downlink communication and an uplink band or uplink bands of one or more neighboring first cells is/are still used for uplink communication, because transmit power of the second access network device is much higher than transmit power of the user terminal, a first access network device may also receive a downlink signal sent by the second access network device on the uplink band when receiving uplink signal sent by the user terminal 1 on the uplink band. Because the uplink band of the second cell is the same as the uplink band of the first cell, the signal sent by the second access network device causes severe interference to the uplink signal sent by the user terminal 1.

It can be learned that using the flexible duplex technology in the TDD mode or the FDD mode may cause interference to a signal of uplink communication. To enable the access network device to use an interference coordination technology (that is, to avoid the interference by properly scheduling and allocating resources), resource scheduling and allocation information needs to be exchanged between access network devices in advance (the resource scheduling and allocation information is information indicating whether the access network device performs uplink communication or performs downlink communication). In existing actual application, the resource scheduling and allocation information may be exchanged between different access network devices by using an X2 interface. However, in practice, it is found that a time period for exchanging the resource scheduling and allocation information between the access network devices by using the X2 interface is extremely long, and the resource scheduling and allocation information cannot be exchanged between the access network devices in time, and consequently, the access network device cannot use the interference coordination technology to avoid the interference.

SUMMARY

Embodiments of the present invention provide a communication method, an access network device, and a system, so that a second access network device can obtain a resource scheduling status of a first access network device in time, and therefore, the second access network device can detect a signal interference status in time, and then can use an interference coordination technology in time to avoid signal interference.

According to a first aspect, a communication method is provided, where the method includes: sending, by a first access network device, indication information to a second access network device within a first time segment of a first subframe, where the first subframe includes a second time segment and the first time segment, the second time segment is used by the first access network device to communicate with a first terminal device, the indication information includes first information, and the first information indicates a communication type of the first access network device within a first target time segment of a second subframe; and communicating, by the first access network device, with a second terminal device or the first terminal device based on a communication type indicated by the first information within the first target time segment.

In one embodiment, the first access network device can notify the second access network device of a resource scheduling status of a subsequent subframe of the first access network device in time, so that the second access network device can detect a signal interference status in time, and the second access network device can use an interference coordination technology in time to avoid signal interference by properly allocating and scheduling resources.

According to a second aspect, a communication method is provided, where the method includes: monitoring, by a second access network device within a third time segment of a third subframe, indication information sent by a first access network device, where the third subframe includes a fourth time segment and the third time segment, the fourth time segment is used by the second access network device to communicate with a third terminal device, the indication information includes first information, and the first information indicates a communication type of the first access network device within a first target time segment of a second subframe; and determining, by the second access network device, a communication type of the first access network device within the first target time segment based on indication information that is obtained through monitoring.

In one embodiment, the second access network device may learn a resource scheduling status of a subsequent subframe of the first access network device in time, so that the second access network device can detect a signal interference status in time, and the second access network device can use an interference coordination technology in time to avoid signal interference by properly allocating and scheduling resources.

In one embodiment, the communication type indicated by the first information is uplink communication.

In one embodiment, the first access network device may notify the second access network device in advance that the communication type of the first access network device within the first target time segment is uplink communication, so that the second access network device may determine in advance whether the second access network device may cause interference to communication of the first access network device within the first target time segment in a subsequent communication process. If the second access network device determines that the second access network device may cause interference to the communication of the first access network device within the first target time segment in the subsequent communication process, the second access network device may adjust a communication resource in time, so as to avoid interference caused by the second access network device to an uplink signal received by the first access network device within the first target time segment in the subsequent communication process.

In one embodiment, if the indication information is used to indicate that the communication type of the first access network device within the first target time segment is uplink communication, when the second access network device does not obtain through monitoring, within the third time segment of the third subframe, the indication information sent by the first access network device, the second access network device determines that the communication type of the first access network device within the first target time segment is downlink communication. In this way, the first access network device may send the indication information only when the communication type within the first target time segment is uplink communication, and the second access network device may determine the communication type within the first target time segment, thereby saving communication resources.

In one embodiment, if the indication information is used to indicate that the communication type of the first access network device within the first target time segment is downlink communication, when the second access network device does not obtain through monitoring, within the third time segment of the third subframe, the indication information sent by the first access network device, the second access network device determines that the communication type of the first access network device within the first target time segment is uplink communication. In this way, the first access network device may send the indication information only when the communication type within the first target time segment is downlink communication, and the second access network device may determine the communication type within the first target time segment, thereby saving communication resources.

In one embodiment, if the second access network device does not obtain through monitoring, within the third time segment of the third subframe, the indication information sent by the first access network device, the second access network device determines that the communication of the first access network device within the first target time segment may not cause interference to communication of the second access network device within a second target time segment of a fourth subframe. In this way, the first access network device may send the indication information only when the communication type within the first target time segment is downlink communication or uplink communication, and the second access network device may determine whether the communication within the first target time segment causes the interference to the communication of the second access network device within the second target time segment of the fourth subframe, thereby saving communication resources.

In one embodiment, the communication type indicated by the first information is uplink communication, the communication type of the second access network device within the second target time segment of the fourth subframe is downlink communication, and the second target time segment is used by the second access network device to communicate with the third terminal device or a fourth terminal device.

In one embodiment, when the communication type of the second access network device within the second target time segment of the fourth subframe is downlink communication, the second access network device may learn in advance that the communication type of the first access network device within the first target time segment is uplink communication, and then may learn in advance that the communication of the second access network device within the second target time segment of the fourth subframe may cause interference to the communication of the first access network device within the first target time segment, so that the second access network device may adjust the communication resource within the second target time segment of the fourth subframe in time, so as to avoid the interference caused by a downlink signal sent by the second access network device within the second target time segment to an uplink signal received by the first access network device within the first target time segment.

In one embodiment, the communication type indicated by the first information is downlink communication.

In one embodiment, the first access network device may notify the second access network device in advance that the communication type of the first access network device within the first target time segment is downlink communication, so that the second access network device may determine in advance whether the communication of the first access network device within the first target time segment may cause interference to communication of the second access network device. If the second access network device determines that the communication of the first access network device within the first target time segment may cause interference to the communication of the second access network device, the second access network device may adjust the communication resource in time, so as to avoid the interference caused by the communication of the first access network device within the first target time segment to the communication of the second access network device.

In one embodiment, the second subframe is separated from the first subframe by at least one subframe.

In one embodiment, the first access network device may notify the second access network device in advance that the communication type of the first access network device within the first target time segment is downlink communication, so that the second access network device may determine in advance whether the communication of the first access network device within the first target time segment may cause interference to communication of the second access network device. If the second access network device determines that the communication of the first access network device within the first target time segment may cause interference to the communication of the second access network device, the second access network device may adjust the communication resource in time, so as to avoid the interference caused by the communication of the first access network device within the first target time segment to the communication of the second access network device.

In one embodiment, the communication type indicated by the first information is downlink communication, the communication type of the second access network device within the second target time segment of the fourth subframe is uplink communication, and the second target time segment is used by the second access network device to communicate with the third terminal device or the fourth terminal device.

In one embodiment, when the communication type of the second access network device within the second target time segment of the fourth subframe is uplink communication, the second access network device may learn in advance that the communication type of the first access network device within the first target time segment is downlink communication, and then may learn in advance that the communication of the first access network device within the first target time segment of the second subframe may cause interference to the communication of the second access network device within the second target time segment, so that the second access network device may adjust the communication resource within the second target time segment of the fourth subframe in time, so as to avoid the interference caused by a downlink signal sent by the first access network device within the first target time segment to an uplink signal received by the second access network device within the second target time segment.

In one embodiment, the first information further indicates a communication resource of the first access network device within the first target time segment.

In one embodiment, the first information may explicitly indicate the communication resource of the first access network device within the first target time segment. For example, the first information may include an information bit, and the first information indicates the communication resource by using the information bit.

In one embodiment, the first information may implicitly indicate the communication resource of the first access network device within the first target time segment. For example, a communication resource used by the first access network device to send the first information may be used to indicate the communication resource of the first access network device within the first target time segment. The second access network device may determine the communication resource used by the first access network device to send the first information as the communication resource of the first access network device within the first target time segment.

In one embodiment, after determining the communication type of the first access network device within the first target time segment, if the second access network device detects that the signal interference exists between the second access network device and the first access network device in a subsequent subframe, the second access network device may allocate, for the second target time segment based on the communication resource of the first access network device within the first target time segment, a communication resource that is different from the communication resource within the first target time segment, so as to avoid the signal interference between the second access network device and the first access network device in the subsequent subframe.

In one embodiment, the indication information further includes second information, and the second information indicates the communication resource of the first access network device within the first target time segment.

In one embodiment, after determining the communication type of the first access network device within the first target time segment, if the second access network device detects that the signal interference exists between the second access network device and the first access network device in a subsequent subframe, the second access network device may allocate, for the second target time segment based on the communication resource of the first access network device within the first target time segment, a communication resource that is different from the communication resource within the first target time segment, so as to avoid the signal interference between the second access network device and the first access network device in the subsequent subframe.

In one embodiment, the first time segment is a last time segment of the first subframe.

In one embodiment, the third time segment is a last time segment of the third subframe.

In one embodiment, the second access network device may avoid switching from a receiving state to a sending state for a plurality of times in the third subframe.

In one embodiment, the third subframe is separated from the fourth subframe by at least one subframe.

In one embodiment, it may be avoided that the resource scheduling and allocation status of the second target time segment is notified to the terminal device for a plurality of times in a subframe of a downlink band.

According to a third aspect, an access network device is provided, where the access network device has a function of implementing behavior of a first access network device in the first aspect or the possible implementations of the first aspect. The function may be implemented by hardware, or may be implemented by hardware by executing corresponding software. The hardware or the software includes one or more units corresponding to the foregoing function. The unit may be software and/or hardware. Based on a same invention concept, for problem-resolving principles and beneficial effects of the access network device, reference may be made to the first aspect and the possible method implementations of the first aspect and the brought beneficial effects. Therefore, for implementation of the access network device, reference may be made to the first aspect and the possible method implementations of the first aspect. No repeated description is provided.

According to a fourth aspect, an access network device is provided, where the access network device has a function of implementing behavior of a second access network device in the second aspect or the possible implementations of the second aspect. The function may be implemented by hardware, or may be implemented by hardware by executing corresponding software. The hardware or the software includes one or more units corresponding to the foregoing function. The unit may be software and/or hardware. Based on a same invention concept, for problem-resolving principles and beneficial effects of the access network device, reference may be made to the second aspect and the possible method implementations of the second aspect and the brought beneficial effects. Therefore, for implementation of the access network device, reference may be made to the second aspect and the possible method implementations of the second aspect. No repeated description is provided.

According to a fifth aspect, an access network device is provided, where the access network device includes a processor, a memory, a communications interface, and one or more programs. The processor, the communications interface and the memory are connected. In one embodiment, the access network device further includes a bus system, and the processor, the communications interface and the memory are connected by using the bus system. The one or more programs are stored in the memory, and the processor invokes the programs stored in the memory to implement the solution in the method design of the foregoing first aspect. For problem-resolving implementations and beneficial effects of the access network device, reference may be made to the first aspect and the possible method implementations of the first aspect and the beneficial effects. No repeated description is provided.

According to a sixth aspect, an access network device is provided, where the access network device includes a processor, a memory, a communications interface, and one or more programs. The processor, the communications interface and the memory are connected. In one embodiment, the access network device further includes a bus system, and the processor, the communications interface and the memory are connected by using the bus system. The one or more programs are stored in the memory, and the processor invokes the programs stored in the memory to implement the solution in the method design of the foregoing second aspect. For problem-resolving implementations and beneficial effects of the access network device, reference may be made to the second aspect and the possible method implementations of the second aspect and the beneficial effects. No repeated description is provided.

According to a seventh aspect, a communications system is provided, where the system includes an access network device of the third aspect and an access network device of the fourth aspect.

According to an eighth aspect, a communications apparatus is provided, including: a memory and a processor, where the processor and the memory are connected, the memory is configured to store a program instruction, and the processor is configured to invoke the program instruction in the memory to perform the method described in the first aspect or in the possible implementations of the first aspect.

According to a ninth aspect, a communications apparatus is provided, including: a memory and a processor, where the processor and the memory are connected, the memory is configured to store a program instruction, and the processor is configured to invoke the program instruction in the memory to perform the method described in the second aspect or in the possible implementations of the second aspect.

According to a tenth aspect, a computer storage medium is provided, where the computer storage medium stores a program, and when being executed, the program implements the method described in the first aspect or in the possible implementations of the first aspect.

According to an eleventh aspect, a computer storage medium is provided, where the computer storage medium stores a program, and when being executed, the program implements the method described in the second aspect or in the possible implementations of the second aspect.

According to a twelfth aspect, a computer program product is provided, where when running on a computer, the computer storage medium enables the computer to perform the method described in the first aspect or in the possible implementations of the first aspect.

According to a thirteen aspect, a computer program product is provided, where when running on a computer, the computer storage medium enables the computer to perform the method described in the second aspect or in the possible implementations of the second aspect.

DESCRIPTION OF EMBODIMENTS

The following describes the embodiments of the present invention with reference to the accompanying drawings.

For ease of understanding the embodiments of the present invention, a system architecture applicable to the embodiments of the present invention is first described below.

Figure 1:
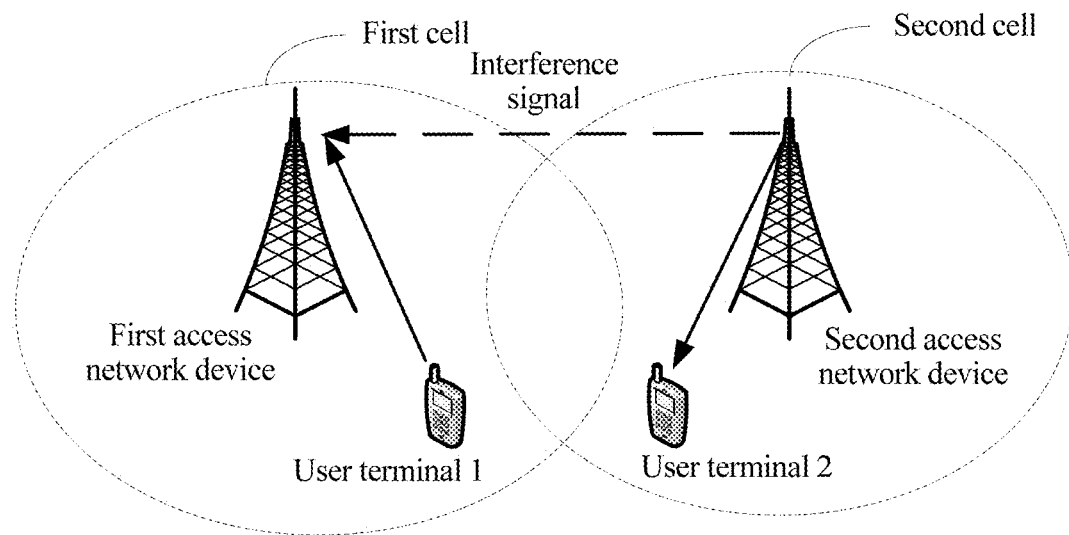
FIG. 1 is a schematic diagram of an existing application scenario according to an embodiment of the present invention.
Figure 2:
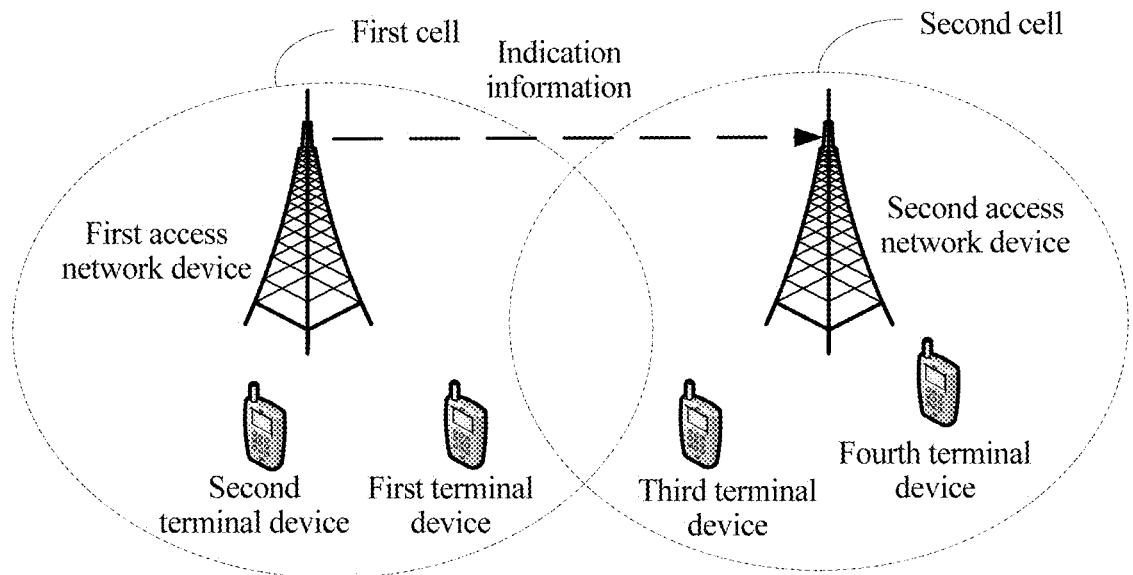
FIG. 2 is a schematic diagram of a system architecture according to an embodiment of the present invention.

FIG. 2 is a diagram of a system architecture according to an embodiment of the present invention. As shown in FIG. 2, the system architecture includes a first access network device, a second access network device, and a plurality of terminal devices. The first access network device, a first terminal device, and a second terminal device are located in a first cell, and the second access network device, a third terminal device, and a fourth terminal device are located in a second cell. Certainly, the first cell and the second cell may include only one terminal device or at least two terminal devices. FIG. 2 shows an example in which the first cell and the second cell respectively include two terminal devices.

Figure 3:
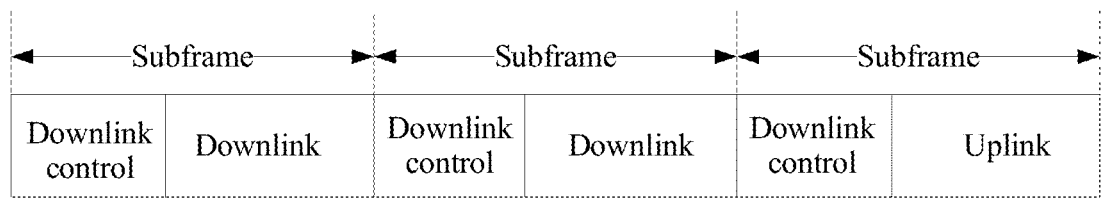
FIG. 3 and FIG. 4 are schematic structural diagrams of a subframe in an existing unpaired spectrum mode in which a flexible duplex technology is used according to an embodiment of the present invention.
Figure 4:
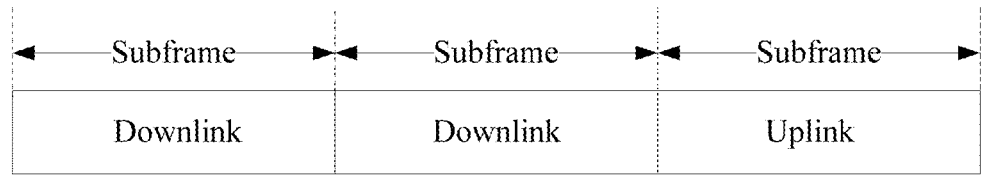

The following describes, with reference to FIG. 3 and FIG. 4, a subframe structure in an existing unpaired spectrum mode (such as a TDD mode) in which a flexible duplex technology is used. In FIG. 3, three consecutive subframes in the unpaired spectrum mode are used as an example. As shown in FIG. 3, one subframe may include two time segments. One time segment is used by an access network device to send control information to a terminal device, that is, a time segment marked with "Downlink control" in FIG. 3. The other time segment is used by the access network device to send data other than the control information to the terminal device, that is, a time segment marked with "Downlink" (DL) in FIG. 3. Alternatively, the other time segment is used by the terminal device to send data to the access network device, that is, a time segment marked with "Uplink" (uplink, UL) in FIG. 3. As shown in FIG. 4, one subframe may alternatively include only one time segment, and the time segment is used by the access network device to send the data other than control information to the terminal device, or is used by the terminal device to send the data to the access network device. A type of communication between the access network device and the terminal device within the time segment marked with "Downlink control" and the time segment marked with "Downlink" is downlink communication. A type of communication between the access network device and the terminal device within the time segment marked with "Uplink" is uplink communication.

Figure 5:
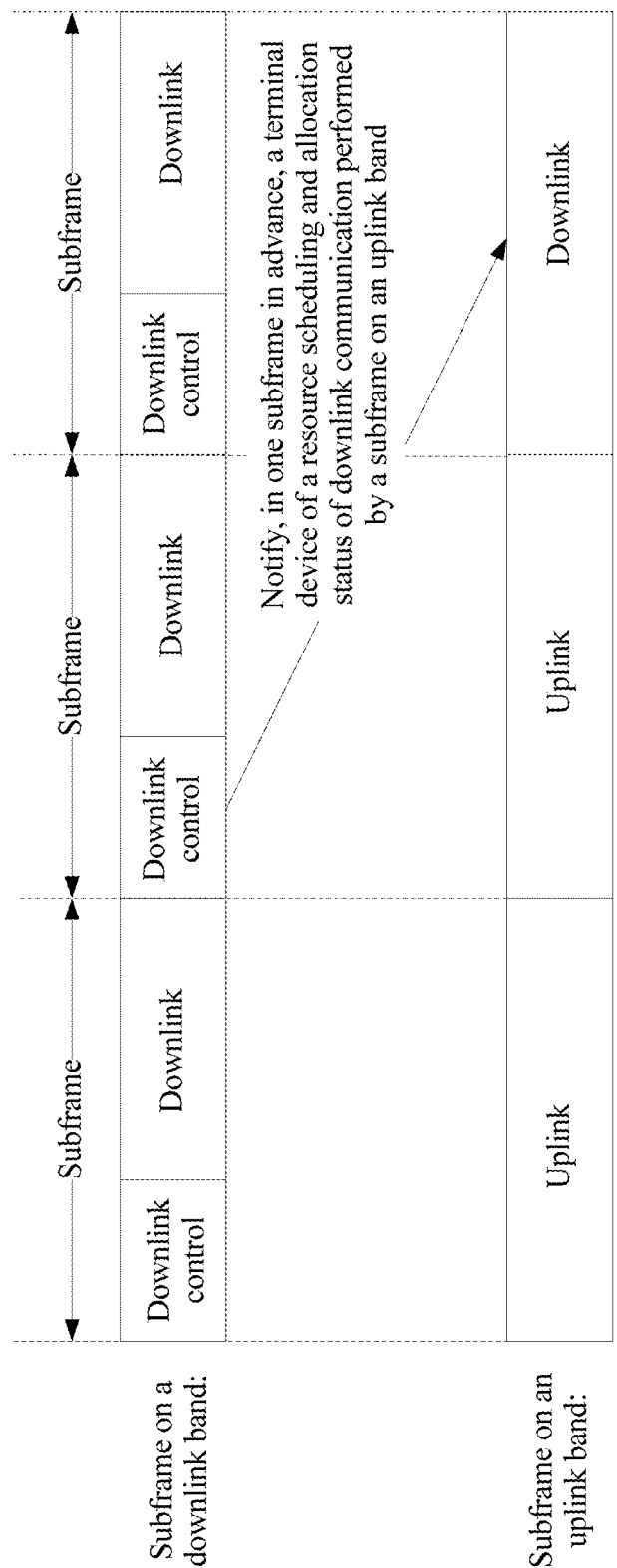
FIG. 5 is a schematic structural diagram of a subframe in an existing paired spectrum mode in which a flexible duplex technology is used according to an embodiment of the present invention.

The following describes, with reference to FIG. 5, a subframe structure in an existing paired spectrum mode (such as an FDD mode) in which the flexible duplex technology is used. In FIG. 5, three consecutive subframes of an uplink band and three consecutive subframes of a downlink band are used as an example. As shown in FIG. 5, one subframe of the downlink band may include two time segments. One time segment is used by the access network device to send the control information to the terminal device, that is, a time segment marked with "Downlink control" in FIG. 5; the other time segment is used by the access network device to send data other than the control information to the terminal device, that is, a time segment marked with "Downlink" in FIG. 5. One subframe of the uplink band includes only one time segment, and the time segment is used by the access network device to send the data other than control information to the terminal device, or is used by the terminal device to send data to the access network device. As shown in FIG. 5, if a third subframe of the uplink band is a downlink subframe, the access network device notifies, in a subframe that is one subframe ahead on the downlink band (that is, a second subframe of the downlink band), the terminal device of a resource scheduling and allocation status of the third subframe of the uplink band, so that the terminal device receives a downlink signal sent by the access network device by using the third subframe of the uplink band. Generally, the access network device notifies the terminal device of the resource scheduling and allocation status of the third subframe of the uplink band in advance by using the control information.

Figure 6:
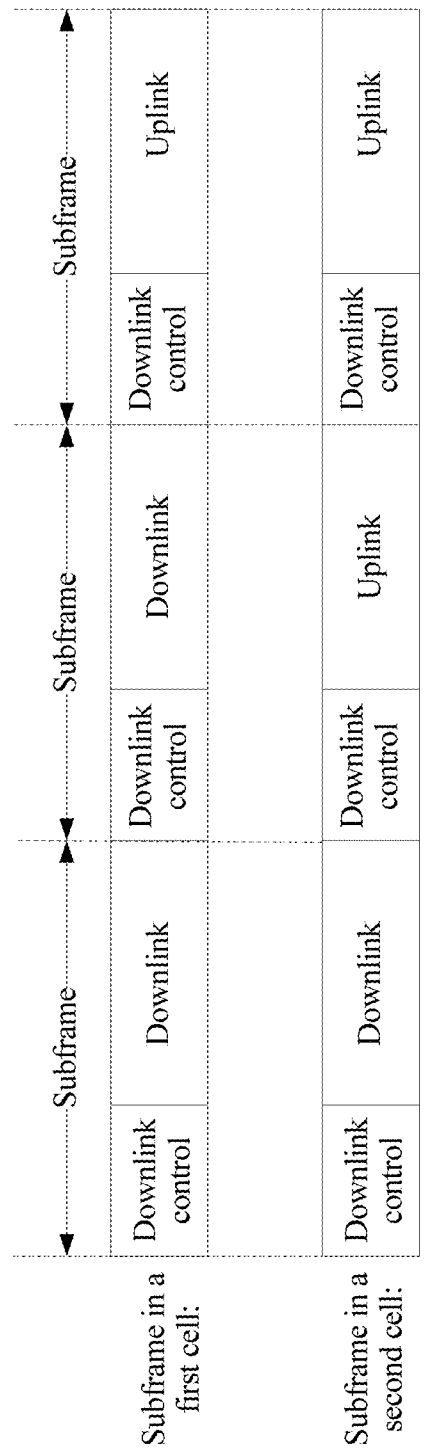
FIG. 6 is a schematic structural diagram of a subframe in an existing unpaired spectrum mode in which a flexible duplex technology is used according to an embodiment of the present invention.

In an existing actual application, in the system shown in FIG. 2, in the unpaired spectrum mode in which the flexible duplex technology is used, at a same time, the first access network device may perform downlink communication and the second access network device may perform uplink communication, as shown by second subframes of the first cell and the second cell in FIG. 6. Consequently, a downlink signal sent by the first access network device causes interference to an uplink signal received by the second access network device. Likewise, at the same time, a downlink signal sent by the second access network device also causes interference to an uplink signal received by the first access network device.

Figure 7:
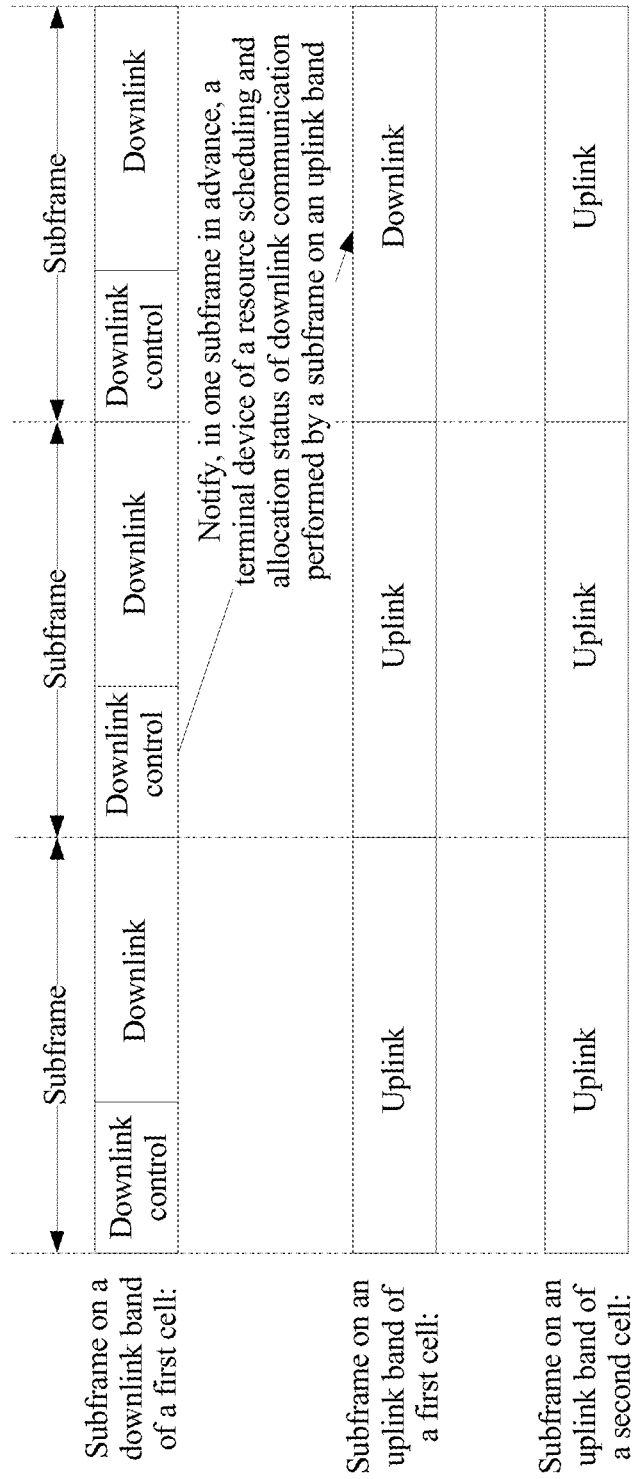
FIG. 7 is a schematic structural diagram of a subframe in an existing paired spectrum mode in which a flexible duplex technology is used according to an embodiment of the present invention.

In an existing actual application, in the system shown in FIG. 2, in the paired spectrum mode in which the flexible duplex technology is used, at a same time, the first access network device may perform downlink communication by using the uplink band and the second access network device may perform uplink communication by using the uplink band, as shown by third subframes on uplink bands of the first cell and the second cell shown in FIG. 7. Consequently, the downlink signal sent by the first access network device causes interference to the uplink signal received by the second access network device. Likewise, at the same time, the downlink signal sent by the second access network device also causes interference to the uplink signal received by the first access network device.

Therefore, the embodiments of the present invention provide a communication method, an access network device, and a communications system, so that the second access network device can obtain the resource scheduling status of the first access network device in time, and therefore, the second access network device can detect a signal interference status in time, and then can use an interference coordination technology in time to avoid signal interference by properly allocating and scheduling resources.

Figure 8:
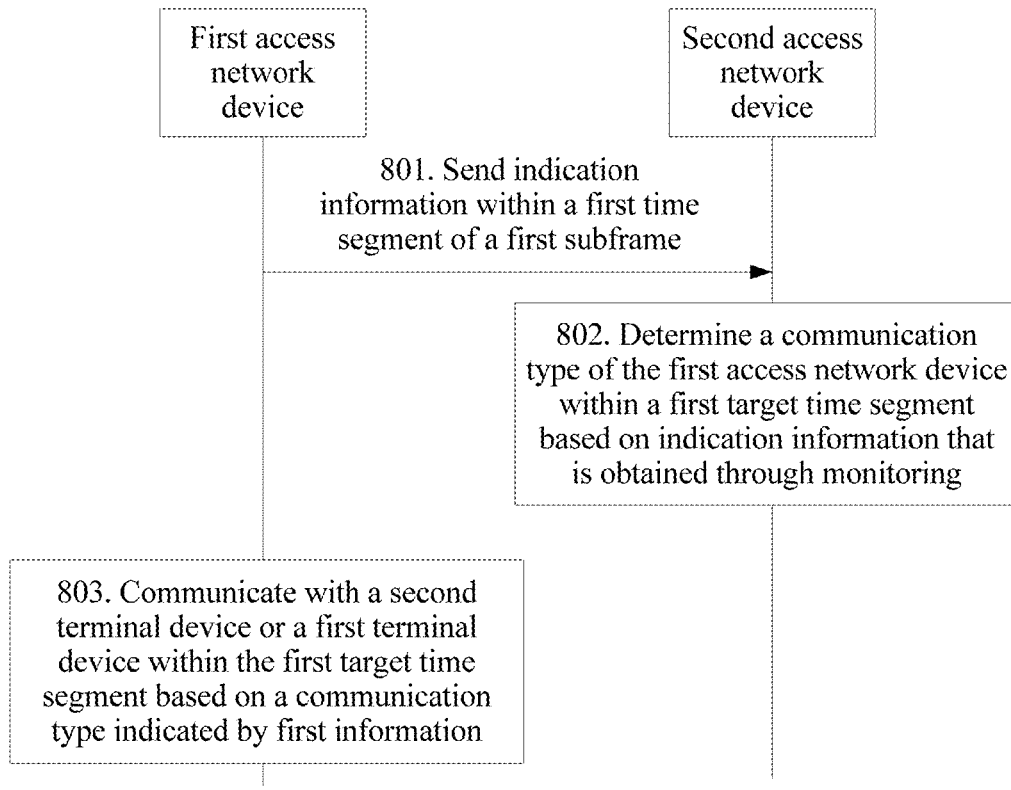
FIG. 8 is a schematic flowchart of a communication method according to an embodiment of the present invention.

FIG. 8 is a schematic flowchart of a communication method according to an embodiment of the present invention. As shown in FIG. 8, the communication method may include operations 801 to 803.

Operation 801. A first access network device sends indication information to a second access network device within a first time segment of a first subframe.

Figure 9:
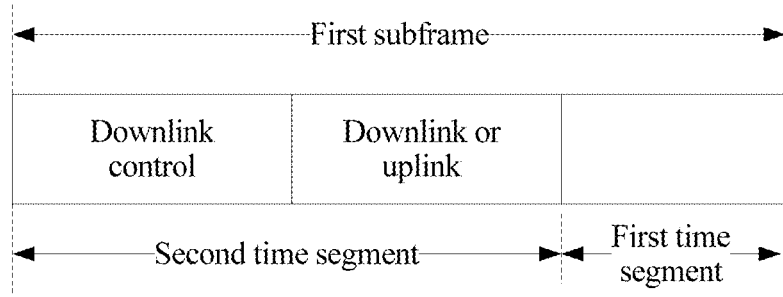
FIG. 9 and FIG. 10 are schematic structural diagrams of a first subframe according to an embodiment of the present invention.
Figure 10:
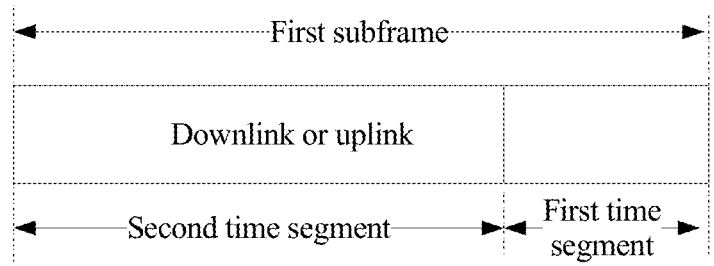

The first subframe may be any subframe of a first cell in which the first access network device is located. The first subframe includes a second time segment and the first time segment, where the second time segment is used by the first access network device to communicate with a first terminal device, as shown in FIG. 9 and FIG. 10. It should be noted that, when the first access network device and the second access network device are in an unpaired spectrum mode, structures of the first subframe may be shown in FIG. 9 and FIG. 10. When the first access network device and the second access network device are in a paired spectrum mode, the first subframe is a subframe of an uplink band, and the structure of the first subframe may be shown in FIG. 10.

The indication information includes first information, where the first information indicates a communication type of the first access network device within a first target time segment of a second subframe. The second subframe may be any subframe following the first subframe. For example, the second subframe may be a first subframe following the first subframe, or a second subframe following the first subframe.

The second subframe may include one or more time segments. For example, the second subframe includes only a time segment used by the first access network device to communicate with the first terminal device or a second terminal device. The second terminal device may be the same as or different from the first terminal device. For another example, in addition to the time segment used by the first access network device to communicate with the first terminal device or the second terminal device, the second subframe may include another time segment, where the another time segment is used by the first access network device to send the indication information to another access network device, or is used to monitor indication information sent by the another access network device.

Figure 11:
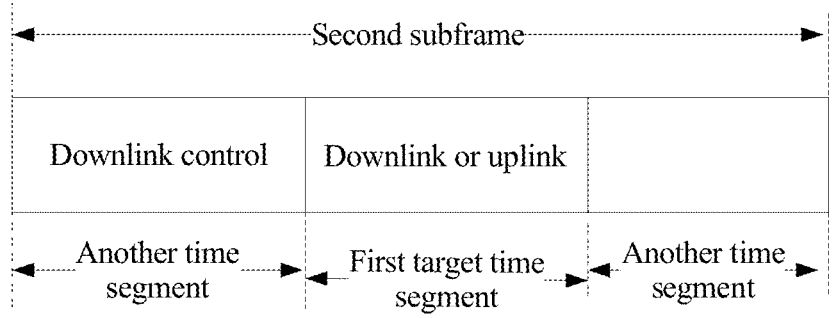
FIG. 11 to FIG. 13 are schematic structural diagrams of a second subframe according to an embodiment of the present invention.
Figure 12:
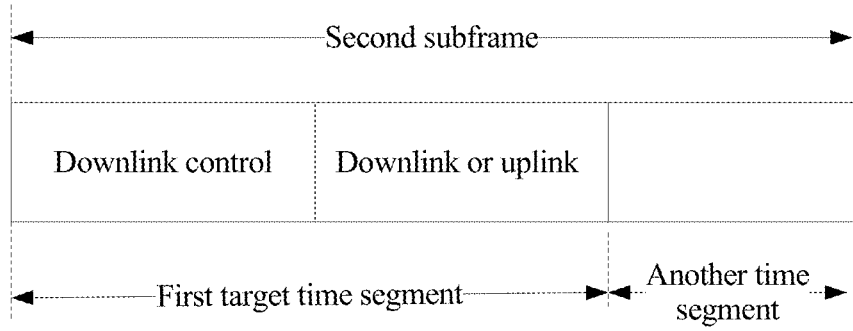
Figure 13:
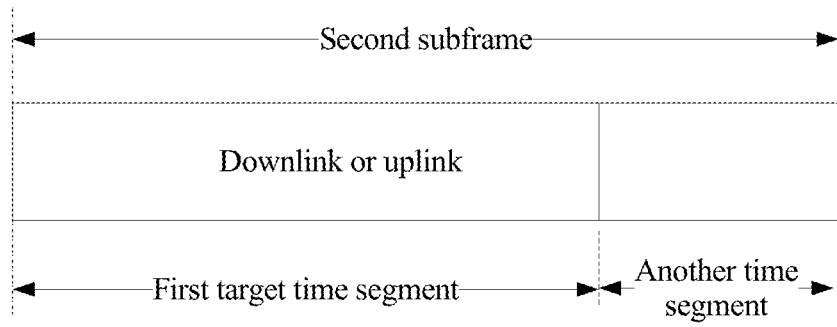

The first target time segment of the second subframe is the time segment used by the first access network device to communicate with the first terminal device or the second terminal device. As shown in FIG. 11 and FIG. 13, the first target time segment may be only a time segment used by the first access network device to send information other than control information to the first terminal device or a time segment used by the first access network device to receive information sent by the first terminal device. As shown in FIG. 12, the first target time segment may further include a time segment used by the first access network device to send the control information to the first terminal device.

In one embodiment, the first target time segment is used for uplink communication, and the communication type that is indicated by the first information and that is within the first target time segment is uplink communication. In one embodiment, the first access network device may notify the second access network device in advance that the communication type of the first access network device within the first target time segment is uplink communication, so that the second access network device may determine in advance whether the second access network device may cause interference to communication of the first access network device within the first target time segment in a subsequent communication process. If the second access network device determines that the second access network device may cause interference to the communication of the first access network device within the first target time segment in the subsequent communication process, the second access network device may adjust a communication resource in time, so as to avoid interference caused by the second access network device to an uplink signal received by the first access network device within the first target time segment in the subsequent communication process.

In one embodiment, the first target time segment is used for downlink communication, and the communication type that is indicated by the first information and that is within the first target time segment is downlink communication. In one embodiment, the first access network device may notify the second access network device in advance that the communication type of the first access network device within the first target time segment is downlink communication, so that the second access network device may determine in advance whether the communication of the first access network device within the first target time segment may cause interference to communication of the second access network device. If the second access network device determines that the communication of the first access network device within the first target time segment may cause interference to the communication of the second access network device, the second access network device may adjust the communication resource in time, so as to avoid the interference caused by the communication of the first access network device within the first target time segment to the communication of the second access network device.

Operation 802. The second access network device determines a communication type of the first access network device within a first target time segment based on indication information that is obtained through monitoring.

In this embodiment of the present invention, the second access network device monitors the indication information sent by the first access network device within a third time segment of a third subframe. After monitoring the indication information, the second access network device determines the communication type of the first access network device within the first target time segment based on indication information that is obtained through monitoring.

The third subframe includes a fourth time segment and the third time segment, and the fourth time segment is used by the second access network device to communicate with a third terminal device.

Figure 14:
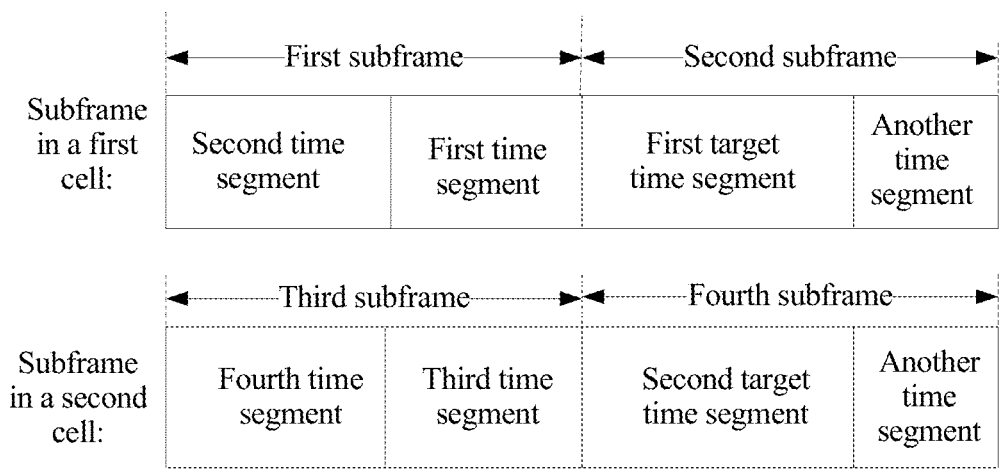
FIG. 14 to FIG. 20 are schematic structural diagrams of a subframe according to an embodiment of the present invention.

In one embodiment, the third time segment is a last time segment of the third subframe, as shown in FIG. 14. If the third time segment is not the last time segment of the third subframe, the second access network device may switch from a receiving state to a sending state for a plurality of times in the third subframe. For example, if the fourth time segment includes a time segment corresponding to downlink control and a time segment corresponding to a downlink, and the third time segment is between the time segment corresponding to the downlink control and the time segment corresponding to the downlink, after sending the control information to the third terminal device, the second access network device needs to switch from the sending state to a monitoring state, so as to monitor the indication information sent by the first access network device; and after receiving the indication information, the second access network device needs to switch from the monitoring state to the sending state, so as to send the information to the third terminal device. Therefore, if the third time segment is between the time segment corresponding to the downlink control and the time segment corresponding to the downlink, the second access network device needs to switch from the receiving state to the sending state for two times. However, if the third time segment is after the time segment corresponding to the downlink control and the time segment corresponding to the downlink, the second access network device needs to switch from the receiving state to the sending state only once in the third subframe. It can be learned that, if the third time segment is the last time segment of the third subframe, the second access network device may avoid switching from a receiving state to a sending state for a plurality of times in the third subframe. When the third time segment is the last time segment of the third subframe, correspondingly, the first time segment is also a last time segment of the first subframe. In this way, the second access network device can successfully monitor, within the third time segment, the indication information sent by the first access network device within the first time segment.

As shown in FIG. 14, the first subframe and the third subframe are within a same time segment, and the second subframe and a fourth subframe are within a same time segment. The second subframe is a subframe following the first subframe, and therefore, the fourth subframe is also a subframe following the third subframe. The fourth subframe includes a second target time segment, and the second target time segment is used by the second access network device to communicate with the third terminal device or a fourth terminal device. The third terminal device may be the same as or different from the fourth terminal device. The fourth subframe may further include another time segment, or the fourth subframe may include only the second target time segment. FIG. 14 shows an example in which the fourth subframe includes the second target time segment and another time segment. As shown in FIG. 14, the second access network device may receive, within the third time segment, the indication information sent by the first access network device within the first time segment.

If the indication information is used to indicate that the communication type of the first access network device within the first target time segment is downlink communication, the second access network device determines that the communication type of the first access network device within the first target time segment is downlink communication. If the indication information is used to indicate that the communication type of the first access network device within the first target time segment is uplink communication, the second access network device determines that the communication type of the first access network device within the first target time segment is uplink communication.

In one embodiment, if the indication information is used to indicate that the communication type of the first access network device within the first target time segment is uplink communication, when the second access network device does not obtain through monitoring, within the third time segment of the third subframe, the indication information sent by the first access network device, the second access network device determines that the communication type of the first access network device within the first target time segment is downlink communication.

In one embodiment, if the indication information is used to indicate that the communication type of the first access network device within the first target time segment is downlink communication, when the second access network device does not obtain through monitoring, within the third time segment of the third subframe, the indication information sent by the first access network device, the second access network device determines that the communication type of the first access network device within the first target time segment is uplink communication.

In one embodiment, if the second access network device does not obtain through monitoring, within the third time segment of the third subframe, the indication information sent by the first access network device, the second access network device determines that the communication of the first access network device within the first target time segment may not cause interference to communication of the second access network device within the second target time segment of the fourth subframe. For example, the second access network device may monitor the indication information sent by the first access network device only when the communication type of the second access network device within the second target time segment of the fourth subframe is uplink communication, and the first access network device sends the indication information only when the communication type of the first access network device within the first target time segment is downlink communication. If the second access network device does not obtain through monitoring, within the third time segment of the third subframe, the indication information sent by the first access network device, the communication type of the first access network device within the first target time segment is uplink communication. Therefore, the communication of the first access network device within the first target time segment may not cause interference to the communication of the second access network device within the second target time segment of the fourth subframe.

Operation 803. The first access network device communicates with a second terminal device or a first terminal device within the first target time segment based on a communication type indicated by the first information.

It can be learned that, by implementing the method described in FIG. 8, the second access network device may learn in advance a resource scheduling status of the first access network device (that is, may learn in advance a type of communication between the first access network device and the terminal device). Therefore, the second access network device can detect a signal interference status in time, and the second access network device can use an interference coordination technology in time to avoid signal interference by properly allocating and scheduling resources. For example, when the first target time segment is used for uplink communication and the second target time segment is used for downlink communication, the second access network device may properly allocate communication resources within the second target time segment to avoid causing the interference to the uplink signal received by the first access network device. For another example, when the first target time segment is used for downlink communication and the second target time segment is used for uplink communication, the second access network device may properly allocate the communication resources within the second target time segment to avoid causing interference to an uplink signal received by the second access network device.

In one embodiment, the first information further indicates a communication resource of the first access network device within the first target time segment. In one embodiment, the communication resource may be a time domain resource, a frequency domain resource, a code domain resource, or the like.

In one embodiment, after determining the communication type of the first access network device within the first target time segment, if the second access network device detects that a downlink signal sent by the first access network device within the first target time segment causes interference to the uplink signal received by the second access network device within the second target time segment, or detects that a downlink signal sent by the second access network device within the second target time segment causes interference to the uplink signal received by the first access network device within the first target time segment, the second access network device allocates, for the second target time segment based on the communication resource of the first access network device within the first target time segment, a communication resource that is different from the communication resource within the first target time segment, so as to avoid the signal interference caused by the first access network device within the first target time segment and by the second access network device within the second target time segment.

In one embodiment, the first information may explicitly indicate the communication resource of the first access network device within the first target time segment. For example, the first information may include an information bit, and the first information indicates the communication resource by using the information bit.

In one embodiment, the first information may implicitly indicate the communication resource of the first access network device within the first target time segment. For example, a communication resource used by the first access network device to send the first information may be used to indicate the communication resource of the first access network device within the first target time segment. The second access network device may determine the communication resource used by the first access network device to send the first information as the communication resource of the first access network device within the first target time segment.

In one embodiment, the indication information further includes second information, and the second information indicates the communication resource of the first access network device within the first target time segment. Likewise, the communication resource may be a time domain resource, a frequency domain resource, a code domain resource, or the like. Likewise, In one embodiment, the second access network device may allocate, for the second target time segment based on the communication resource of the first access network device within the first target time segment, a communication resource that is different from the communication resource within the first target time segment, so as to avoid the signal interference caused by the first access network device within the first target time segment and by the second access network device within the second target time segment.

In one embodiment, the communication type that is indicated by the first information and that is within the first target time segment is uplink communication. A communication type of the second access network device within the second target time segment of the fourth subframe is downlink communication. In one embodiment, when the communication type of the second access network device within the second target time segment of the fourth subframe is downlink communication, the second access network device may learn in advance that the communication type of the first access network device within the first target time segment is uplink communication, and then may learn in advance that the communication of the second access network device within the second target time segment of the fourth subframe may cause interference to the communication of the first access network device within the first target time segment, so that the second access network device may adjust a communication resource within the second target time segment of the fourth subframe in time, so as to avoid the interference caused by the downlink signal sent by the second access network device within the second target time segment to the uplink signal received by the first access network device within the first target time segment.

Figure 15:
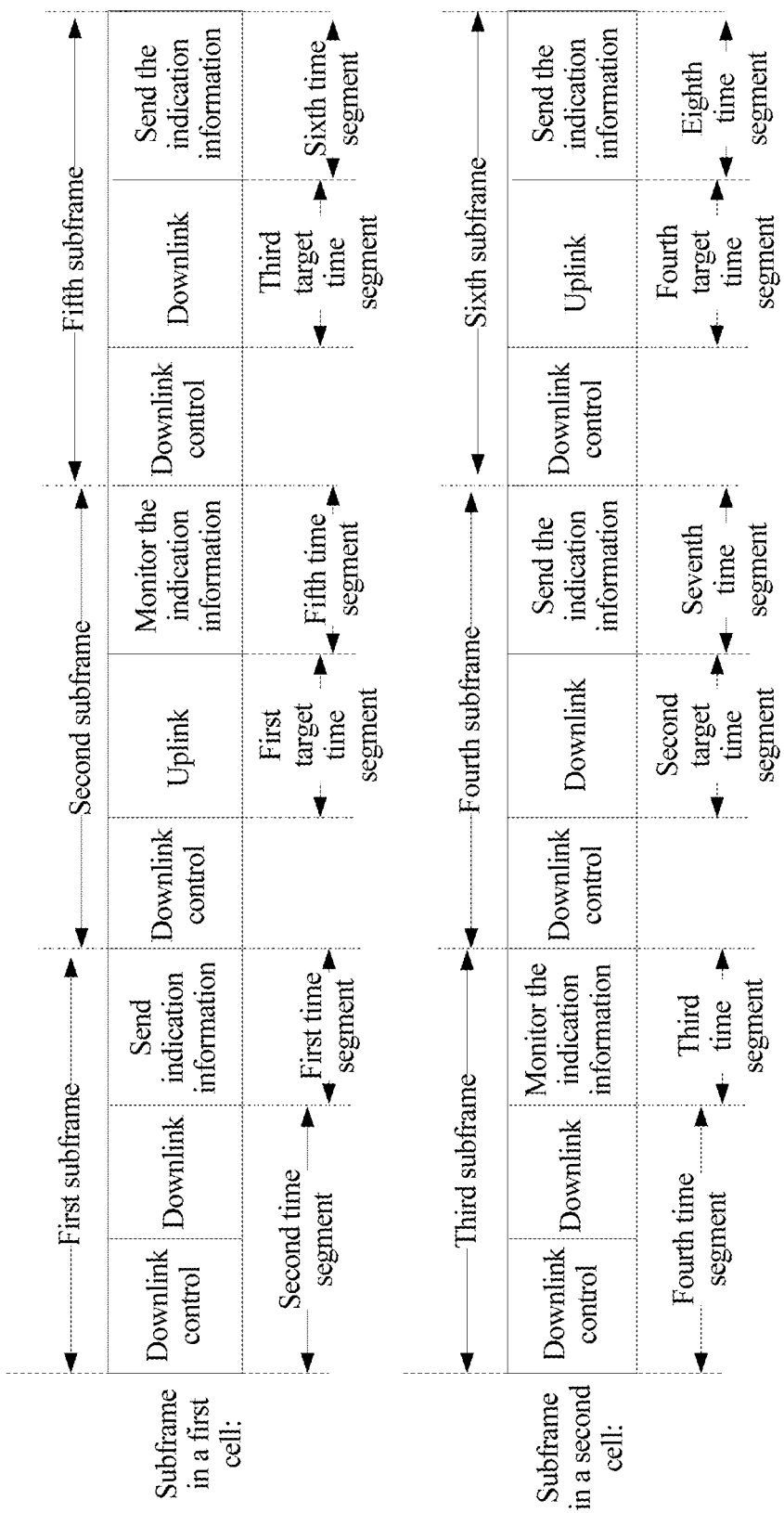

For example, in the unpaired spectrum mode, as shown in FIG. 15, if the communication type within the first target time segment of the second subframe is uplink communication, the first access network device sends the indication information within the first time segment of the first subframe, where the indication information indicates that the communication type within the first target time segment of the second subframe is uplink communication. If the communication type within the second target time segment of the fourth subframe is downlink communication, the second access network device monitors, within the third time segment of the third subframe, the indication information sent by the first access network device, so that the second access network device may learn, in a subframe that is one subframe ahead, that the communication type of the first access network device within the first target time segment is uplink communication, and then, the second access network device may adjust the communication resource within the second target time segment of the fourth subframe, so as to avoid the interference caused by the downlink signal sent by the second access network device within the second target time segment to the uplink signal received by the first access network device within the first target time segment. Likewise, if a communication type within a fourth target time segment of a sixth subframe is uplink communication, the second access network device sends, to the first access network device within a seventh time segment of the fourth subframe, indication information used to indicate that the communication type within the fourth target time segment is uplink communication. If a communication type of the first access network device within a third target time segment of a fifth subframe is downlink communication, the first access network device monitors, within a fifth time segment of the second subframe, indication information sent by the second access network device. In this way, the first access network device may learn, in a subframe that is one subframe ahead, that the communication type of the second access network device within the fourth target time segment is uplink communication, and then, the first access network device may adjust a communication resource within the third target time segment in time, so as to avoid interference caused by a downlink signal sent by the first access network device within the third target time segment to an uplink signal received by the second access network device within the fourth target time segment.

In one embodiment, in the paired spectrum mode, the third subframe is separated from the fourth subframe by at least one subframe. Correspondingly, the second subframe is separated from the first subframe by at least one subframe.

Figure 16:
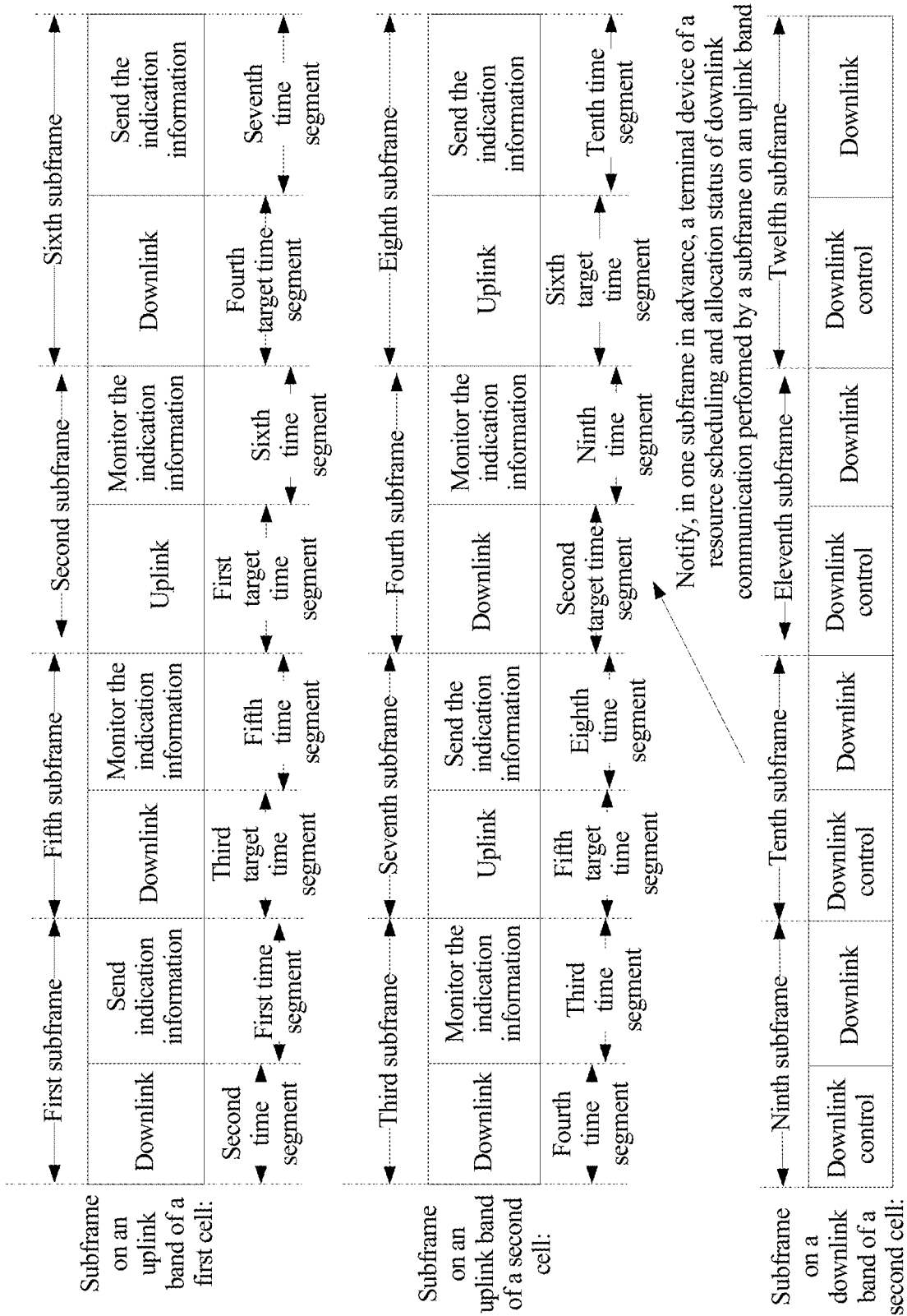

For example, in the paired spectrum mode, as shown in FIG. 16, if the communication type within the first target time segment of the second subframe is uplink communication, the first access network device sends the indication information within the first time segment of the first subframe, where the indication information indicates that the communication type within the first target time segment of the second subframe is uplink communication. If the communication type within the second target time segment of the fourth subframe is downlink communication, the second access network device monitors, within the third time segment of the third subframe, the indication information sent by the first access network device, so that the second access network device may learn, in a subframe that is two subframes ahead, that the communication type of the first access network device within the first target time segment is uplink communication, and then, the second access network device may adjust the communication resource within the second target time segment, so as to avoid the interference caused by the downlink signal sent by the second access network device within the second target time segment to the uplink signal received by the first access network device within the first target time segment. Likewise, if a communication type within a sixth target time segment of an eighth subframe is uplink communication, the second access network device sends, to the first access network device within an eighth time segment of a seventh subframe, indication information used to indicate that the communication type within the sixth target time segment is uplink communication. If the communication type of the first access network device within the fourth target time segment of the sixth subframe is downlink communication, the first access network device monitors, within a fifth time segment of the fifth subframe, the indication information sent by the second access network device. In this way, the first access network device may learn, in a subframe that is two subframes ahead, that the communication type of the second access network device within the sixth target time segment is uplink communication, and then, the first access network device may adjust a communication resource within the fourth target time segment in time, so as to avoid interference caused by a downlink signal sent by the first access network device within the fourth target time segment to an uplink signal received by the second access network device within the sixth target time segment.

In the paired spectrum mode in which a flexible duplex technology is used, the access network device needs to notify, in a subframe that is one subframe ahead on a downlink band, the terminal device of the resource scheduling and allocation status when a subframe of an uplink band is used for downlink communication. For example, as shown in FIG. 16, if the fourth subframe is the downlink subframe within the second target time segment, the second access network device needs to notify, in a tenth subframe, the terminal device of a resource scheduling and allocation status within the second target time segment, and the same is true for the first access network device. Therefore, if the third subframe is separated from the fourth subframe by at least one subframe, it may be ensured that the second access network device learns, in a subframe that is two subframes ahead, a resource scheduling and allocation status of the first access network device, so as to schedule and allocate, in a subframe that is two subframes ahead, a transmission resource of the second access network device within the second target time segment of the fourth subframe. Therefore, the second access network device needs to notify, in the tenth subframe of the downlink band, the terminal device of only an updated resource scheduling and allocation status within the second target time segment, so as to avoid notifying, in the tenth subframe of the downlink band, the terminal device twice of the resource scheduling and allocation status within the second target time segment.

In one embodiment, the communication type that is indicated by the first information and that is within the first target time segment is downlink communication. The communication type of the second access network device within the second target time segment of the fourth subframe is uplink communication. In one embodiment, when the communication type of the second access network device within the second target time segment of the fourth subframe is uplink communication, the second access network device may learn in advance that the communication type of the first access network device within the first target time segment is downlink communication, and then may learn in advance that the communication of the first access network device within the first target time segment of the second subframe may cause interference to the communication of the second access network device within the second target time segment, so that the second access network device may adjust the communication resource within the second target time segment of the fourth subframe in time, so as to avoid the interference caused by the downlink signal sent by the first access network device within the first target time segment to the uplink signal received by the second access network device within the second target time segment.

Figure 17:
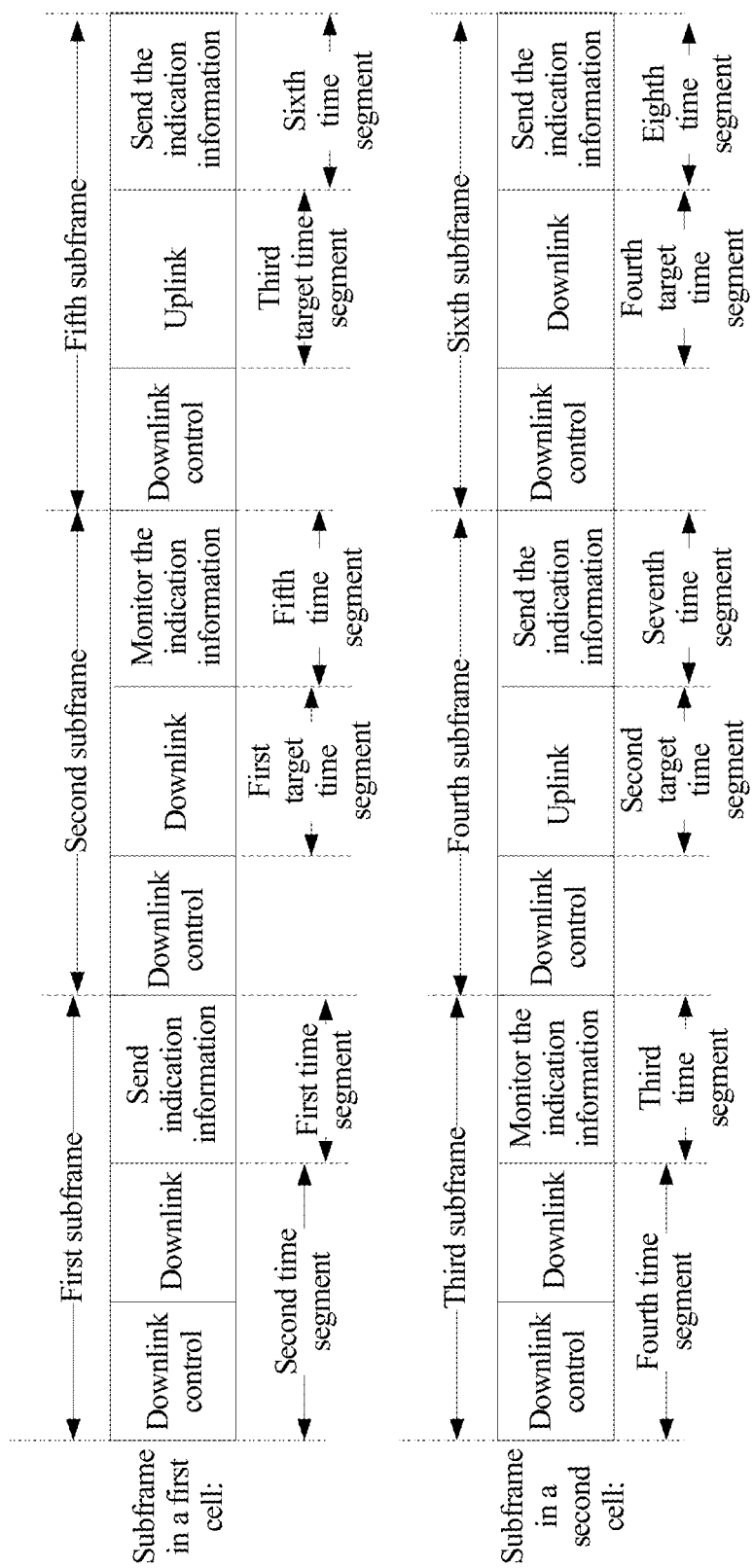

For example, in the unpaired spectrum mode, as shown in FIG. 17, if the communication type within the first target time segment of the second subframe is downlink communication, the first access network device sends the indication information within the first time segment of the first subframe, where the indication information indicates that the communication type within the first target time segment of the second subframe is downlink communication. If the communication type within the second target time segment of the fourth subframe is uplink communication, the second access network device monitors, within the third time segment of the third subframe, the indication information sent by the first access network device, so that the second access network device may learn in advance that the communication type of the first access network device within the first target time segment is downlink communication, and then, the second access network device may adjust the communication resource within the second target time segment, so as to avoid the interference caused by the downlink signal sent by the first access network device within the first target time segment to the uplink signal received by the second access network device within the second target time segment. Likewise, if the communication type within the fourth target time segment of the sixth subframe is downlink communication, the second access network device sends, to the first access network device within the seventh time segment, indication information used to indicate that the communication type within the fourth target time segment is downlink communication. If the communication type of the first access network device within the third target time segment of the fifth subframe is uplink communication, the first access network device monitors, within the fifth time segment of the second subframe, the indication information sent by the second access network device. In this way, the first access network device may learn in advance that the communication type of the second access network device within the fourth target time segment is downlink communication, and then, the first access network device may adjust the communication resource within the third target time segment in time, so as to avoid interference caused by a downlink signal sent by the second access network device within the fourth target time segment to an uplink signal sent by the first access network device within the third target time segment.

Figure 18:
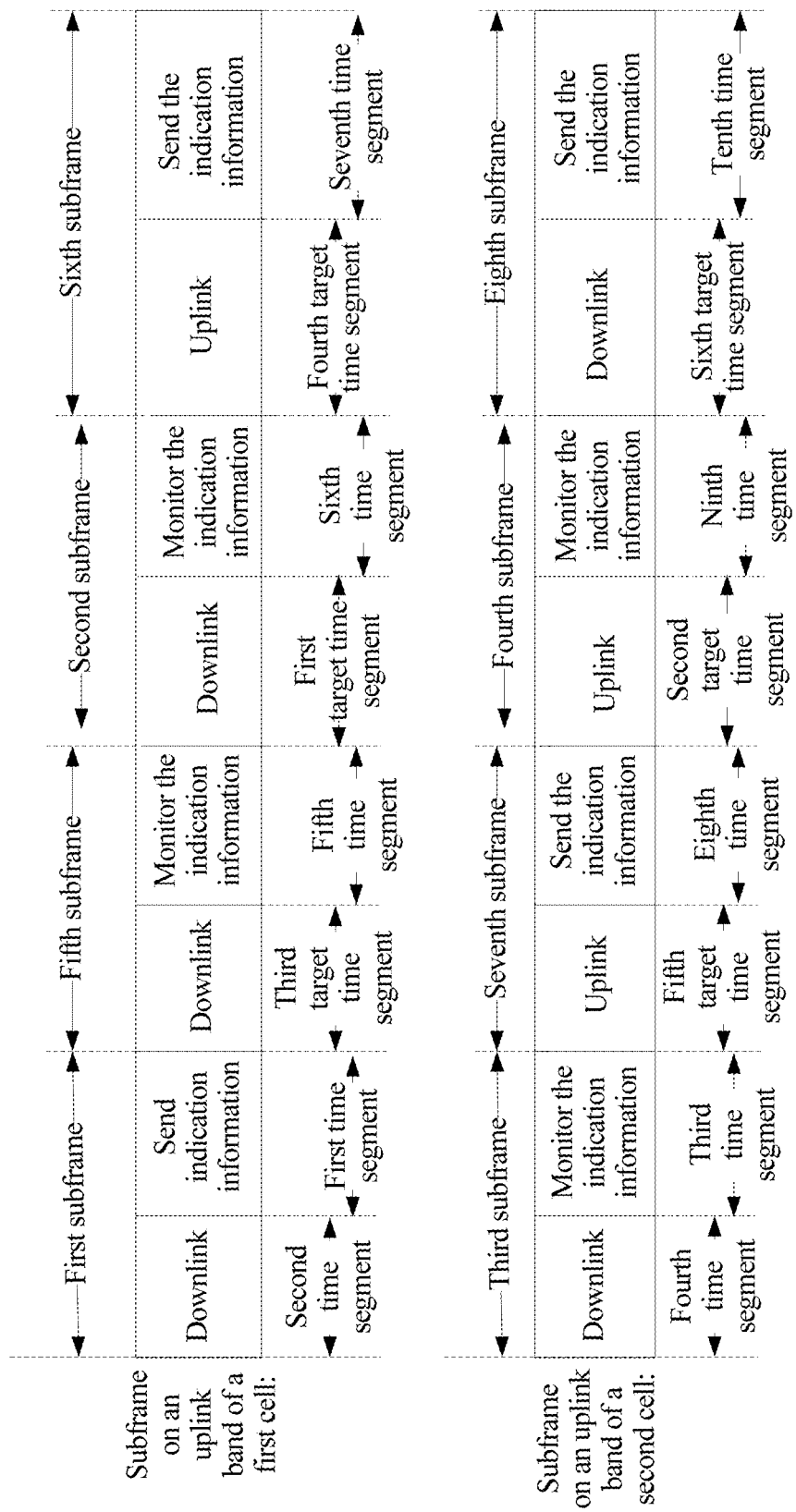

For another example, in the paired spectrum mode, as shown in FIG. 18, if the communication type within the first target time segment of the second subframe is downlink communication, the first access network device sends the indication information within the first time segment of the first subframe, where the indication information indicates that the communication type within the first target time segment of the second subframe is downlink communication. If the communication type within the second target time segment of the fourth subframe is uplink communication, the second access network device monitors, within the third time segment of the third subframe, the indication information sent by the first access network device, so that the second access network device may learn in advance that the communication type of the first access network device within the first target time segment is downlink communication, and then, the second access network device may adjust the communication resource within the second target time segment, so as to avoid the interference caused by the downlink signal sent by the first access network device within the first target time segment to the uplink signal sent by the second access network device within the second target time segment. Likewise, if the communication type within the sixth target time segment of the eighth subframe is downlink communication, the second access network device sends, to the first access network device within the eighth time segment of the seventh subframe, indication information used to indicate that the communication type within the sixth target time segment is downlink communication. If the communication type of the first access network device within the fourth target time segment of the sixth subframe is uplink communication, the first access network device monitors, within the fifth time segment of the fifth subframe, the indication information sent by the second access network device. In this way, after learning that the communication type of the second access network device within the sixth target time segment is downlink communication, the first access network device may adjust the communication resource within the fourth target time segment in time, so as to avoid interference caused by a downlink signal sent by the second access network device within the sixth target time segment to an uplink signal sent by the first access network device within the fourth target time segment.

In one embodiment, in a time segment used to send the indication information and a time segment used to monitor the indication information, the subframe of the first cell includes only the time segment used to send the indication information. Correspondingly, in the time segment used to send the indication information and the time segment used to monitor the indication information, a subframe of a second cell includes only the time segment used to monitor the indication information. In one embodiment, the second access network device may obtain the resource allocation status of the first access network device in each subframe in advance, so as to adjust the communication resource of the subframe of the second access network device in time, and avoid the signal interference between the second access network device and the first access network device.

Figure 19:
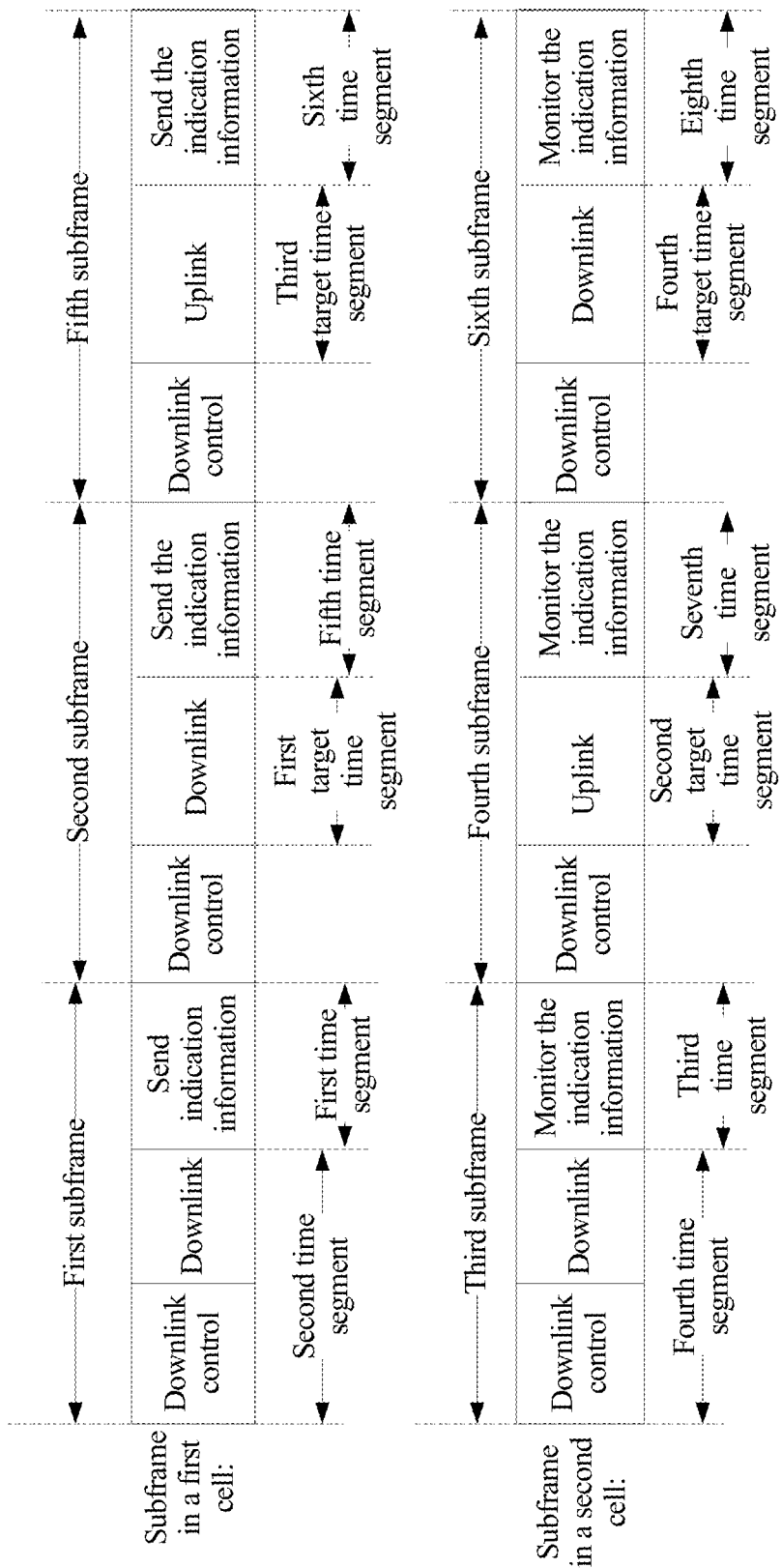

For example, as shown in FIG. 19, in the unpaired spectrum mode, the first access network device sends the indication information within the first time segment of the first subframe, where the indication information is used to indicate that the communication type within the first target time segment of the second subframe is downlink communication. The first access network device sends the indication information within the fifth time segment of the second subframe, where the indication information is used to indicate that the communication type within the third target time segment of the fifth subframe is uplink communication. The second access network device monitors the indication information within the third time segment of the third subframe, a seventh time segment of the fourth subframe, and an eighth time segment of the sixth subframe.

Figure 20:
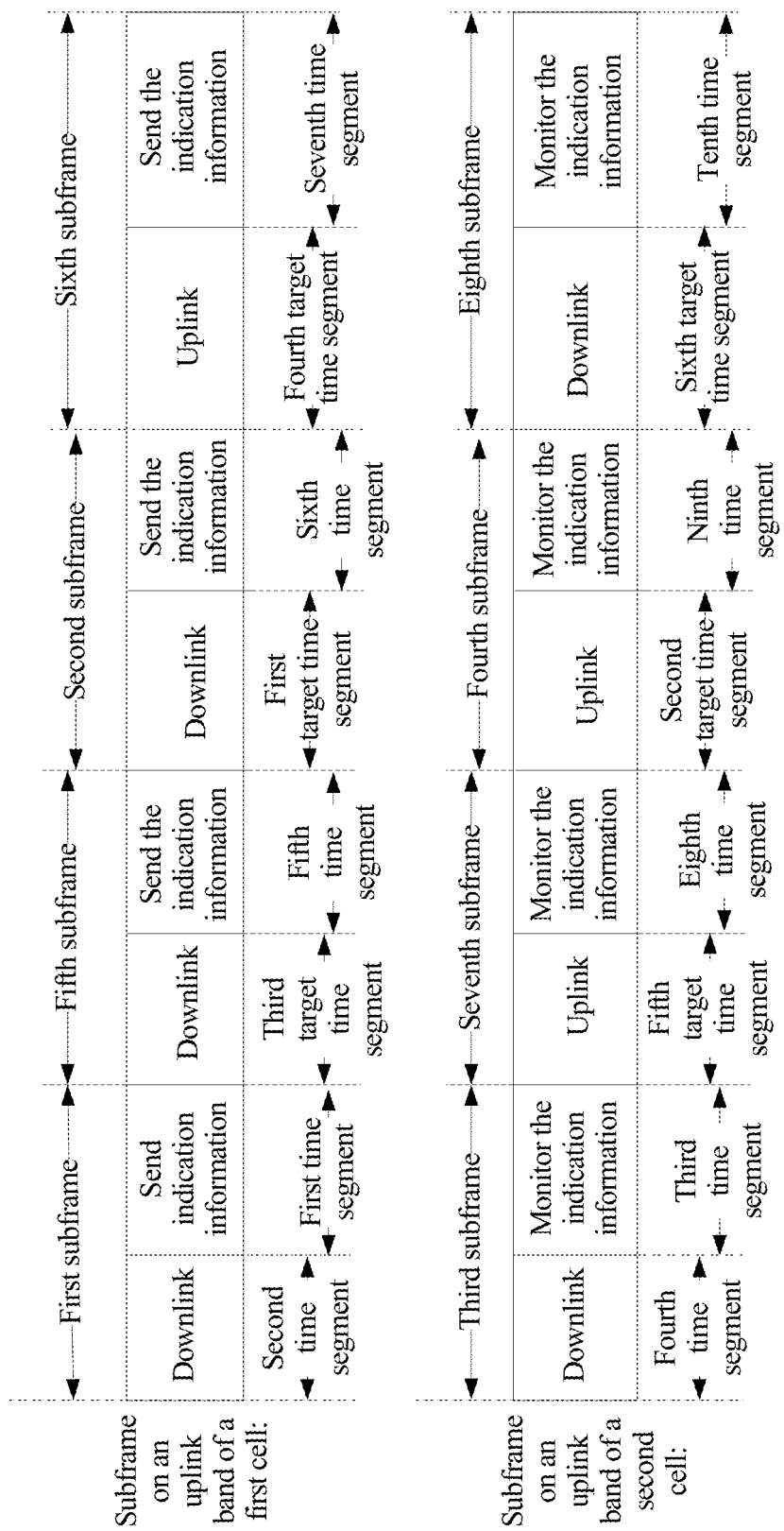

For another example, as shown in FIG. 20, in the paired spectrum mode, the first access network device sends the indication information within the first time segment of the first subframe, where the indication information is used to indicate that the communication type within the first target time segment of the second subframe is downlink communication. The first access network device sends the indication information within the fifth time segment of the fifth subframe, where the indication information is used to indicate that the communication type within the fourth target time segment of the sixth subframe is uplink communication. The first access network device also sends the indication information within a sixth time segment of the second subframe and a seventh time segment of the sixth subframe. The second access network device monitors the indication information within the third time segment of the third subframe, the eighth time segment of the seventh subframe, a ninth time segment of the fourth subframe, and a tenth time segment of the eighth subframe.

An embodiment of the present invention provides an access network device, where the access network device has a function of implementing behavior of a first access network device in the foregoing method embodiments. The function may be implemented by hardware, or may be implemented by hardware by executing corresponding software. The hardware or the software includes one or more units corresponding to the foregoing function. The unit may be software and/or hardware. Based on a same invention concept, for problem-resolving principles and beneficial effects of the access network device, reference may be made to the method implementations of the first access network device and the brought beneficial effects in the foregoing method embodiments. For implementation of the access network device, reference may be made to the method implementations of the first access network device in the foregoing method embodiments. No repeated description is provided.

An embodiment of the present invention provides an access network device, where the access network device has a function of implementing behavior of a second access network device in the foregoing method embodiments. The function may be implemented by hardware, or may be implemented by hardware by executing corresponding software. The hardware or the software includes one or more units corresponding to the foregoing function. The unit may be software and/or hardware. Based on a same invention concept, for problem-resolving principles and beneficial effects of the access network device, reference may be made to the method implementations of the second access network device and the brought beneficial effects in the foregoing method embodiments. For implementation of the access network device, reference may be made to the method implementations of the second access network device in the foregoing method embodiments. No repeated description is provided.

Figure 21:
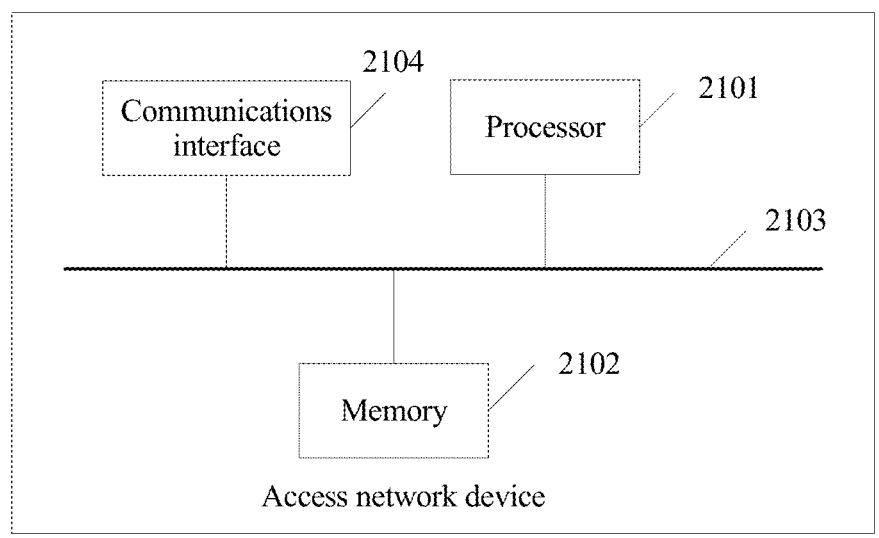
FIG. 21 is a schematic structural diagram of an access network device according to an embodiment of the present invention.

FIG. 21 is a possible schematic structural diagram of an access network device disclosed in an embodiment of the present invention. As shown in FIG. 21, the access network device 2100 includes a processor 2101, a memory 2102, and a communications interface 2104. The processor 2101, the memory 2102, and the communications interface 2104 are connected. In one embodiment, the access network device 2100 further includes a bus system 2103. The processor 2101, the memory 2102, and the communications interface 2104 are connected by using the bus system 2103.

The processor 2101 may be a central processing unit (CPU), a general purpose processor, a coprocessor, a digital signal processor (DSP), an application-specific integrated circuit (ASIC), a field programmable gate array (FPGA) or another programmable logic device, a transistor logic device, a hardware component, or any combination thereof. Alternatively, the processor 2101 may be a combination of processors implementing a computing function, for example, a combination of one or more microprocessors, a combination of the DSP and a microprocessor, or the like.

The bus system 2103 may be a peripheral component interconnect (PCI for short) bus, an extended industry standard architecture (EISA for short) bus, or the like. The bus system 2103 may be classified into an address bus, a data bus, a control bus, and the like. For ease of representation, only one thick line is used to represent the bus in FIG. 21, but this does not mean that there is only one bus or only one type of bus.

The communications interface 2104 is configured to implement communication with another network element (for example, a first access network device, a second access network device, or a terminal device).

The processor 2101 invokes program code stored in the memory 2102 to perform any one or more operations performed by the first access network device in the foregoing method embodiments, or the processor 2101 invokes the program code stored in the memory 2102 to perform any one or more operations performed by the second access network device in the foregoing method embodiments.

Based on a same inventive concept, problem-resolving principles of the access network device provided in this embodiment of the present invention is similar to those of the method embodiments of the present invention. Therefore, for implementation of the access network device, reference may be made to the implementation of the methods. For brevity of description, details are not described herein again.

An embodiment of the present invention further provides a communications system, where the system includes a first access network device and a second access network device, the first access network device is configured to perform operations performed by the first access network device in the foregoing method embodiments, and the second access network device is configured to perform operations performed by the second access network device in the foregoing method embodiments.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method performed by a first access network device, the method comprising:
    sending indication information to a second access network device within a first time segment of a first subframe, wherein the first subframe comprises two or more time segments including a second time segment and the first time segment located as a last time segment of the first subframe, wherein the second time segment is used by the first access network device to communicate with a first terminal device, wherein the indication information comprises first information indicating a communication type of the first access network device within a first target time segment of a second subframe, wherein the first subframe is separated from the second subframe by at least one subframe to ensure that the second access network device learns, in a subframe that is one or more subframes ahead, a resource scheduling and allocation status of the first access network device, so as to schedule and allocate, in a subframe that is two subframes ahead, a transmission resource of the second access network device within a second target time segment of a fourth subframe; and
    communicating with a second terminal device or the first terminal device within the first target time segment based on the communication type indicated by the first information.

2. The method according to claim 1, wherein the communication type indicated by the first information is uplink communication.

3. The method according to claim 1, wherein the communication type indicated by the first information is downlink communication.

4. The method according to claim 1, wherein the first information further indicates a communication resource of the first access network device within the first target time segment.

5. The method according to claim 1, wherein the indication information further comprises second information, and the second information indicates a communication resource of the first access network device within the first target time segment.

6. A communication method performed by a second access network device, the method comprising:
    monitoring, within a third time segment of a third subframe, indication information sent by a first access network device, wherein the third subframe comprises two or more time segments including a fourth time segment and the third time segment located as a last time segment of the third subframe, wherein the fourth time segment is used by the second access network device to communicate with a third terminal device, wherein the indication information comprises first information indicating a communication type of the first access network device within a first target time segment of a second subframe, wherein the third subframe is separated from the second subframe by at least one subframe to ensure that the second access network device learns, in a subframe that is one or more subframes ahead, a resource scheduling and allocation status of the first access network device, so as to schedule and allocate, in a subframe that is two subframes ahead, a transmission resource of the second access network device within a second target time segment of a fourth subframe; and
    determining, by the second access network device, the communication type of the first access network device within the first target time segment based on the indication information that is obtained through monitoring.

7. The method according to claim 6, wherein the communication type indicated by the first information is uplink communication.

8. The method according to claim 7, wherein the communication type of the second access network device within the second target time segment of the fourth subframe is downlink communication, and the second target time segment is used by the second access network device to communicate with the third terminal device or a fourth terminal device.

9. The method according to claim 6, wherein the communication type indicated by the first information is downlink communication.

10. The method according to claim 9, wherein the communication type of the second access network device within the second target time segment of the fourth subframe is uplink communication, and the second target time segment is used by the second access network device to communicate with the third terminal device or a fourth terminal device.

11. The method according to claim 6, wherein the first information further indicates a communication resource of the first access network device within the first target time segment.

12. The method according to claim 6, wherein the indication information further comprises second information, and the second information indicates a communication resource of the first access network device within the first target time segment.

13. A communications system, comprising:
a first access network device and a second access network device, wherein
the first access network device is configured to send indication information to the second access network device within a first time segment of a first subframe, wherein the first subframe comprises two or more time segments including a second time segment and the first time segment located as a last time segments of the first subframe, wherein the second time segment is used by the first access network device to communicate with a first terminal device, wherein the indication information comprises first information indicating a communication type of the first access network device within a first target time segment of a second subframe, wherein the first frame subframe is separated from the second subframe by at least one subframe to ensure that the second access network device learns, in a subframe that is one or more subframes ahead, a resource scheduling and allocation status of the first access network device, so as to schedule and allocate, in a subframe that is two subframes ahead, a transmission resource of the second access network device within a second target time segment of a fourth subframe;
the first access network device is further configured to communicate with a second terminal device or the first terminal device within the first target time segment based on the communication type indicated by the first information;
the second access network device is configured to monitor, within a third time segment of a third subframe, the indication information sent by the first access network device, wherein the third subframe comprises a fourth time segment and the third time segment, the fourth time segment is used by the second access network device to communicate with a third terminal device; and
the second access network device is further configured to determine the communication type of the first access network device within the first target time segment based on the indication information that is obtained through monitoring.

14. An apparatus, comprising:
a storage medium including executable instructions; and
a processor;
wherein the executable instructions, when executed by the processor, cause the apparatus to:
send indication information to a second access network device within a first time segment of a first subframe, wherein the first subframe comprises two or more time segments including a second time segment and the first time segment located as a last time segment of the first subframe, wherein the second time segment is used by a first access network device to communicate with a first terminal device, wherein the indication information comprises first information indicating a communication type of the first access network device within a first target time segment of a second subframe, wherein the first frame subframe is separated from the second subframe by at least one subframe to ensure that the second access network device learns, in a subframe that is one or more subframes ahead, a resource scheduling and allocation status of the first access network device, so as to schedule and allocate, in a subframe that is two subframes ahead, a transmission resource of the second access network device within a second target time segment of a fourth subframe; and
communicate with a second terminal device or the first terminal device within the first target time segment based on the communication type indicated by the first information.

15. The apparatus according to claim 14, wherein the communication type indicated by the first information is uplink communication.

16. The apparatus according to claim 14, wherein the communication type indicated by the first information is downlink communication.

17. The apparatus according to claim 14, wherein the first information further indicates a communication resource of the first access network device within the first target time segment.

18. The apparatus according to claim 14, wherein the indication information further comprises second information, and the second information indicates a communication resource of the first access network device within the first target time segment.

* * * * *